United States Patent [19]
Schrader

[11] 3,746,149
[45] July 17, 1973

[54] REVERSIBLE VIBRATORY FEEDER
[75] Inventor: Preston H. Schrader, Louisville, Ky.
[73] Assignee: Rex Chainbelt Inc., Milwaukee, Wis.
[22] Filed: Nov. 22, 1971
[21] Appl. No.: 200,892

[52] U.S. Cl. .................... 198/220 CC, 198/220 DB
[51] Int. Cl. ............................................. B65g 27/00
[58] Field of Search .............. 198/220 CC, 220 DB, 198/220 DD, 220 CC

[56] References Cited
UNITED STATES PATENTS
| | | | |
|---|---|---|---|
| 2,984,339 | 5/1961 | Musschoot | 198/220 CC |
| 3,068,996 | 12/1962 | Musschoot | 198/220 CC |
| 3,216,557 | 11/1965 | Morris et al. | 198/220 CC |

Primary Examiner—Richard E. Aegerter
Assistant Examiner—Joseph E. Valenza
Attorney—Marshall & Yeasting

[57] ABSTRACT

A resiliently supported vibrating conveyor or processing unit is equipped with at lease two spaced apart tunable dynamic vibration absorbers and a vibration generator. Each absorber, according to its adjustment, is effective in each of several directions to control the motion of the conveyor in response to vibratory drive force from the vibration generator. By selective adjustment of the absorbers the conveyor can be caused to convey in either direction or agitate the material in the conveyor without conveying.

5 Claims, 2 Drawing Figures

REVERSIBLE VIBRATORY FEEDER

BACKGROUND OF THE INVENTION

Vibratory conveyors or processing units that can selectively convey in either direction have been used. The direction of conveying is conventionally controlled by selectively energizing either of a pair of vibration exciters or by mechanically changing the angle of the support or guide links connecting the conveyor to a base. Each of these arrangements has serious disadvantages. When two vibration exciters are employed it is difficult to prevent interaction between them since both motors must be continuously operated to prevent destructive chattering of the motor shaft on its bearing as the idle motor is vibrated. Likewise, it is a very difficult engineering design problem to provide adjustable guide links or guide link mountings that can withstand the vibratory forces transmitted through the links. These problems are avoided in a vibratory conveyor or processing unit constructed according to the invention.

SUMMARY OF THE INVENTION

According to the invention a resiliently mounted vibratory conveyor or processing unit is vibrated by a rotating eccentric weight journalled on the unit and at least two multi-directional tunable dynamic vibration absorbers mounted on the unit are selectively tuned to restrict the vibratory motion of the conveyor or processing unit to a desired path of vibration.

DETAILED DESCRIPTION OF THE PREFERRED EMBODIMENTS

Figure 1:
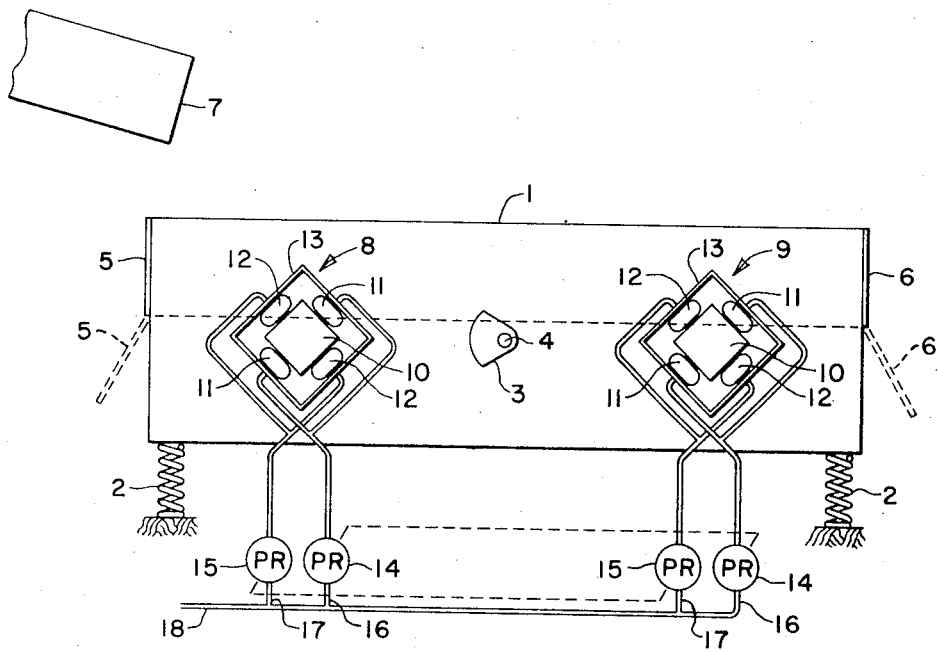
FIG. 1 is a simplified side elevation of a vibratory conveyor or processing unit embodying the invention.

A vibratory conveyor or processing unit embodying the invention may comprise a trough 1 that is supported on soft isolation springs 2 so that it may readily respond to vibratory force produced by eccentric weights 3 carried on a shaft 4 journalled in and extending transversely of the trough 1 near but not necessarily at its center of gravity. The shaft 4 may be the armature shaft of a drive motor, not shown or may be a shaft belt connected to a separately mounted motor. In the latter arrangement the elasticity of the drive belt allows the conveyor 1 to vibrate relative to the separately mounted motor.

If the conveyor trough 1 is to be used as a processing unit, it may be provided with gates 5, 6 at one or both ends to control the discharge of material. Material may be supplied through a chute 7. The material in the trough may, for example, be subjected to a leaching process, may be dried, cooled, or heated, or otherwise processed.

The direction and rate of conveying in the trough 1 is controlled by a plurality of tunable dynamic vibration absorbers 8, 9. As is well known, a dynamic vibration absorber comprises a mass connected by a spring to the body whose vibration is to be reduced. The mass and spring combination is tuned or adjusted to have a natural frequency nearly equal and preferably equal to the frequency of the disturbing force. The absorber vibrates in response to the disturbing force to generate a counter force that is very nearly equal and opposite to the disturbing force.

As indicated in FIG. 1, each absorber comprises a mass 10 supported by a plurality of air springs 11, 12 from a frame 13 attached to the trough 1. As shown, the air springs 11 act along a line inclined up to the right, while the air springs 12 act along a line inclined up to the left. By variation of the air pressure in the air springs the spring rate along each line may be varied. The air pressure may be controlled by pressure regulating valves 14, 15 installed in air lines 16, 17 leading from a supply line 18 to the air springs.

In operation, the eccentric weight 3 tends to drive the trough 1 in a circular orbit. The circular orbit is modified to an ellipse or straight lines along the axes of the air springs by tuning the absorbers 8 and 9 by varying the air pressure in the respective air bags or springs. For example, to convey to the right the air springs 12 are inflated to a pressure such that the absorber is resonant, at the drive frequency, along the axis of the springs 12. It then counterbalances the force of the eccentric weights 3 acting in that direction leaving the trough 1 free to vibrate along the axis of the springs 11. The amplitude of vibration is controlled by adjusting the pressure in the springs 11 and may be varied from a small amplitude, actually determined by the damping in the air springs, to at least the amplitude of vibration produced by the eccentric weight when the absorbers are absent or ineffective. The damping in the air springs is minimized by using small diameter piping between the air springs of each pair.

Conveying to the left is accomplished by tuning the absorber to resonance with the drive by adjustment of the springs 11, thus limiting the vibratory motion to a path inclined up and to the left.

Two absorber assemblies are indicated in FIG. 1. These are similar. The adjustments are, in general, similar as indicated by the dashed lines connecting the pressure regulators for common control. However additional individual controls should be included to compensate for differences in the individual air springs, differences in the effective distances of the absorbers from the center of gravity of the trough 1, or variations in load distribution.

In the preferred structure one absorber mass cooperates with either or both sets of springs. While a separate mass may be used with each set of springs, it is preferred to use one mass because of the reduction in total mass of the system.

As shown, two opposed air springs are used along each axis of vibration. If the full range of adjustment is not required, or if adjustment along one axis is unnecessary, one or more solid springs, such as steel coil springs or rubber springs, may be substituted for one or more of the air springs.

In the arrangement shown in FIG. 1 in which the lines of action of the springs are at right angles to each other, a condition of substantial vibration without conveying, to produce mechanical fluidization, may be achieved by adjusting the air springs for conveying in a direction opposite to the conveying induced by the generally circular orbiting motion of the eccentric weight acting alone. When so adjusted the actual path of vibration is a nearly vertical elliptical orbit.

Figure 2:
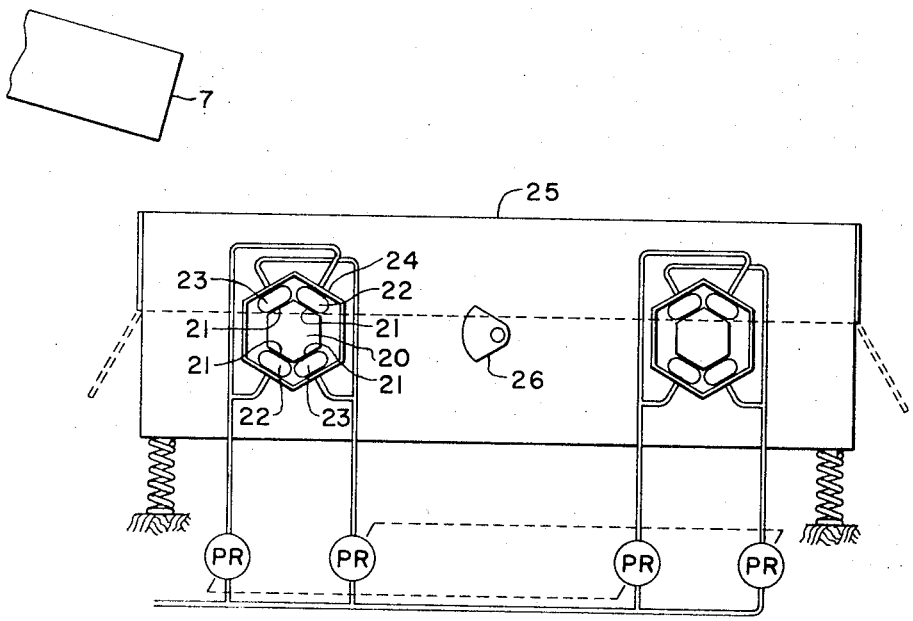
FIG. 2 is a simplified side elevation of a vibratory conveyor showing a slightly different arrangement of dynamic absorbers to further control the vibratory motion of the conveyor or processing unit.

In the event that further control of the direction and amplitude of vibration is required, the absorbers may be constructed as indicated in FIG. 2. In this arrangement each of the absorbers includes a mass 20 having spring seats 21 arranged at angles of 60° or a multiple of 60° to each other. As in the embodiment shown in FIG. 1, a plurality of air springs 22, 23 are arranged between the mass 20 and a surrounding frame 24 attached to a conveyor trough 25. A rotating eccentric weight 26 provides the vibratory drive force.

In this arrangement, when the springs 22 and the mass 20 are tuned to resonance the conveyor vibrates normal to the axis of these springs, i.e. along an inclined path directed upwardly to the left. Likewise, tuning the springs 23 and reducing the pressure in the springs 22 results in a vibratory path inclined upwardly to the right. Equal pressures in the sets of air springs provides a vertical spring rate of about one and three quarters that obtained along a single spring axis by the same pressure in one set of springs. Thus, by equalizing the pressure at a reduced amount in both sets of springs the absorber may be tuned to limit the vibratory motion of the trough to a horizontal path. By equalizing the pressure at a higher value the absorber may be tuned to eliminate horizontal motion of the trough leaving only the vertical motion in response to the eccentric weight.

While the principles of the invention have been illustrated with reference to a linear vibratory motion device, the same principles may be applied to apparatus vibrating along a rotary or helical path. In such structure the absorbers may control the motion from a rotary motion in a plane to a helical motion or a straight line vertical motion by suppressing any substantial response of the system to the disturbing force components in the undesired directions.

I claim:

1. In a vibration control system for a body to be vibrated, in combination, a body to be vibrated, a rotatable eccentric weight journalled in the body, at least two dynamic vibration absorbers mounted in spaced apart positions on the body, each dynamic vibration absorber comprising an absorber weight and at least two sets of springs with the line of action of each set of springs being normal to the axis of rotation of the eccentric weight and angularly displaced from the line of action of the other set of springs, and means for selectively varying the spring rate of each set of springs.

2. A vibratory control system according to claim 1 in which the absorber weights are spaced from the center of gravity of the body.

3. A vibratory control system according to claim 1 in which the multiple sets of springs are oriented such that the line of action of a set is normal to a selected path of vibration of the body.

4. A vibratory control system according to claim 1 in which at least some of the springs connecting the absorber weight to the body are air springs.

5. A vibratory control system according to claim 1 in which the means for applying the vibratory disturbing force comprises a rotating eccentric weight.

* * * * *